United States Patent Office 3,519,659
Patented July 7, 1970

3,519,659
6α,9α-DIFLUORO-16α-METHYL-
PREDNISOLONE-21-ALS
Julius Schmidlin and Ludwig Ehmann, Basel, Switzerland, assignors to Ciba Corporation, New York, N.Y., a corporation of Delaware
No Drawing. Filed Dec. 4, 1967, Ser. No. 687,445
Claims priority, application Switzerland, Dec. 9, 1966, 17,634/66
Int. Cl. C07c 169/32
U.S. Cl. 260—397.45                                   7 Claims

ABSTRACT OF THE DISCLOSURE

The derivatives of 6α,9α-difluoro-16α-methyl-prednisolone having an aldehyde group in 21-position instead of the hydroxyl group, and functional derivatives thereof, such as hydrates, acetals and esters of the hydrates, display an anti-inflammatory and thymolytic activity and have also antileucaemic activity. These new compounds are prepared by conventional methods.

SUMMARY OF THE INVENTION

The present invention concerns and has for its object the provision of new 21-aldehydes of the pregnane series and of their derivatives having the following general formula (I)
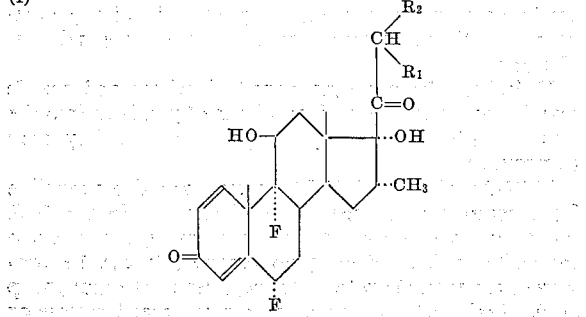

in which $R_1$ and $R_2$ each represent a free, esterified or etherified hydroxyl group or $R_1+R_2$ represent an oxo group. The products of the invention possess anti-inflammatory, thymolytic and antileucaemic activity and may be used as antiphlogistics and antileucaemic medicaments. They are also valuable intermediates.

DESCRIPTION OF THE PREFERRED EMBODIMENTS

In the new compounds of the above formula the said esterified hydroxy groups are above all derived from organic carboxylic acids of the aliphatic, alicyclic, aromatic or heterocyclic series, especially those with 1 to 18 carbon atoms, e.g. from formic, acetic, propionic, a butyric acid or valeric acid such as n-valeric acid, or from trimethylacetic or trifluoracetic acid, from a caproic acid such as β-trimethylpropionic acid or diethylacetic acid, or oenanthic, caprylic, pelargonic, capric acid, from an undecylic acid, for example undecylenic acid, from lauric, myristic, palmitic or a stearic acid, for example oleic acid, from a cyclopropane-, cyclobutane-, cyclopentane- or cyclohexane-carboxylic acid, for example cyclopropylmethanecarboxylic, cyclobutyl-methanecarboxylic, cyclo- pentyl-ethanecarboxylic, cyclohexyl-ethanecarboxylic acid, from cyclopentyl-, cyclohexyl- or phenyl-acetic or -propionic acids or benzoic acid, or phenoxy-alkanoic acids such as phenoxyacetic acid, dicarboxylic acids such as succinic, phthalic or quinolinic acid, or furan-2-carboxylic, 5-tertiary butyl-furan-2-carboxylic, 5-bromo-furan-2-carboxylic acid, from nicotinic or isonicotinic acid, or from sulphonic acids such as benzenesulphonic acids, or of inorganic acids, for example phosphoric or sulphuric acids.

Particularly valuable etherified hydroxyl groups are those which are derived from alcohols with 1 to 8 carbon atoms, such as lower aliphatic alkanols, e.g. ethanol, methanol, propanol, isopropanol, a butyl or amyl alcohol, or from araliphatic alcohols, especially from monocyclic aryl-lower aliphatic alcohols such as benzyl alcohol, or from heterocyclic alcohols, such as α-tetrahydropyranol or furanol.

Special mention deserve also cyclic ethers derived from polyhydric alcohols, for example from ethyleneglycol, from the propyleneglycols or butyleneglycols.

The new compounds of the above Formula I possess valuable pharmacological properties. Inter alia, they display above all an anti-inflammatory and thymolytic activity as can be shown in the animal test, for example on rats. Furthermore, as can be shown, for example, in the animal test, for instance on rats (Fischer rats RS) they have an antileucaemic activity. The new compounds may therefore be used as antiphlogistics and antileucaemic medicaments. The new compounds are also valuable intermediates for the manufacture of other useful substances, especially pharmacologically active compounds.

Particularly valuable are those compounds of the above Formula I—in which $R_1$ and $R_2$ each represents a free or etherified hydroxyl group, or a free hydroxyl group and an etherified hydroxyl group, or $R_1+R_2$ stand for an oxo group, the etherified hydroxyl groups being derived from alkanols with 1 to 3 carbon atoms—and especially the 21-methyl-hemiacetal of $\Delta^{1,4}$-3,20,21-trioxo-6α,9α - difluoro - 11β,17α - hydroxy - 16α - methylpregnadiene which, when given to the rat subcutaneously in a dose of 0.01 to 0.1 mg. per kg. bodyweight, produces a distinct antiphlogistic effect.

The compounds of the above Formula I are accessible by known methods; more especially, they are obtained (a) when in a compound of the general formula (II)
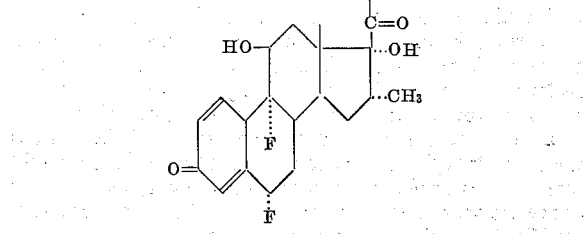

in which R represents a residue convertible into the oxo group or into the group

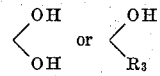

wherein $R_3$ is an etherified hydroxyl group; the residue R is so converted, or (b) when a double bond is introduced in known manner into the 1,2-position of a compound of the formula (III)
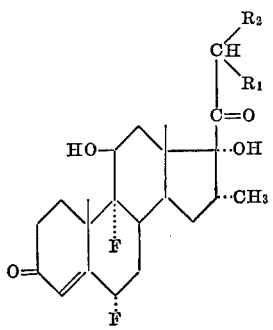

in which $R_1$ and $R_2$ have the same meanings as in Formula I; or (c) by splitting the 9β,11β-epoxide group in a compound of the formula

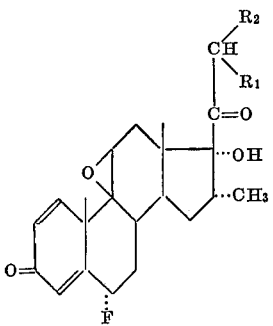

in which $R_1$ and $R_2$ have the same meanings as in the Formula I with hydrogen fluoride or with a hydrogen fluoride donor; and, if desired, by treating a resulting compound of the Formula I, in which

represents a free oxo group or at least one of the groups $R_1$, $R_2$ is a free hydroxyl group, with an esterifying or etherifying reagent, or treating a compound of the Formula I, in which at least one of the groups $R_1$, $R_2$ represents an esterified or etherified hydroxyl group, with a hydrolyzing reagent.

When the grouping

is introduced into a compound of the Formula II by converting the group R by the above method (a), the latter is preferably a free hydroxyl group together with a hydrogen atom which is converted in known manner into the aldehyde group or one of its above-mentioned derivatives. According to a preferred variant of the process the 21-hydroxyl group is converted into a sulphonic acid ester, for example into the para-tosyl ester, the latter is converted with a tertiary aromatic base (for example with pyridine) into the quaternary salt, the salt is converted in a weakly alkaline solution with a para-nitroso-dialkylaniline (for example para-nitroso-dimethylaniline) into the 21-nitrone, and the latter is hydrolyzed with a dilute aqueous mineral acid to the desired 21-aldehyde.

Another generally suitable process is the direct dehydrogenation of the 21-hydroxypregnanes used as starting materials with reducible metal salts in known manner. The oxidant used is, for example, cupric acetate in a suitable solvent such as methanol or ethanol, if desired or required in the presence of an acid, for example of acetic acid. According to a special variant of this dehydrogenation the 21-hydroxypregnane is treated with molecular oxygen in the presence of the above mentioned reducible metal salts, for example cupric acetate, used in a catalytic proportion. Alternatively, the dehydrogenation of the 21-hydroxyl group in the starting materials mentioned may be carried out with selenium dioxide, advantageously in a suitable solvent, such as methanol or glacial acetic acid. The reaction may be accelerated or completed by heating. Finally, the dehydrogenation may also be achieved with manganese dioxide.

The final products obtained from the starting materials mentioned by dehydrogenation in the 21-position with the aid of the processes described above are obtained in different forms, depending on the method of isolation used. Inter alia, the aldehydes formed generally settle out from anhydrous alcohols in the form of their hemiacetals. From hydroxyl-free solvents in the presence of water the 21,21-dihydroxy compounds corresponding to the aldehydes are formed which, generally when just left to themselves over phosphorous pentoxide, lose water and pass into the yellow, free aldehydes.

When the free aldehydes or their hemiacetals or the corresponding 21,21-dihydroxy compounds are treated with acylating agents, such as a carboxylic acid halide or anhydride, for example acetic anhydride, preferably in the presence of a strong inorganic acid, for example sulphuric acid or an organic sulphonic acid such as para-toluenesulphonic acid, or a tertiary base such as pyridine, they yield the 21,21-diacyl esters.

When the free aldehydes or their hemiacetals or the corresponding 21,21-dihydroxy compounds of the Formula I are reacted with alcohols in the presence of an acid catalyst, the corresponding diacetals are obtained. A corresponding reaction with polyhydric alcohols furnishes the afore-mentioned cyclic acetals. Alternatively, the acetals may be formed by reacting the free aldehydes or their hemiacetals or the corresponding 21,21-dihydroxy compounds with orthoformic acid esters of the relevant alcohols.

If desired, the afore-mentioned diacylates and acetals may be converted by acid or alkaline hydrolysis into the free aldehydes or into the corresponding 21,21-dihydroxy compounds.

21,21-diacylates and 21,21-diacetals are also accessible from compounds of the above Formula I in which R stands for two halogen atoms, for example, two bromine atoms. Such 21,21-dihalogeno compounds can be converted, for example with metal acylates of the first group of the Periodic Table, such as an alkali metal acetate or silver acetate, into corresponding 21,21-diacylates, or with an alkali metal alcoholate, for example sodium methylate, into the 21,21-diethers.

The double bond is introduced into compounds of the Formula III by method (b) with the use of a known chemical or microbiological dehydrogenating method. From among the former there may be mentioned as an example the dehydrogenation by means of selenium dioxide or selenous acid, preferably in a tertiary aliphatic alcohol, such as tertiary butanol or tertiary amyl alcohol or with 2,3-dichloro-5,6-dicyano-1,4-benzoquinone in boiling benzene or dioxane. For dehydrogenation in the 1,2-position a bromine atom may be introduced in known manner in the 2-position which is then eliminated in the form of hydrogen bromide.

The microbiological dehydrogenation is performed, for example, with cultures of microorganisms of the species *Corynebacterium simplex*, *Septomyxa affinis* or *Didymella lycopersici* or with their enzymes isolated from the mycelium.

According to method (c) the 9β,11β-epoxide group is split in known manner with hydrogen fluoride, using it in the anhydrous form, if desired or required in an inert solvent such as chloroform, tetrahydrofuran or especially dimethylformamide or as aqueous hydrofluoric acid. It is also possible to use a hydrogen fluoride donor, for example a salt of this acid with a tertiary organic base, for example pyridine, or a derivative of hydrofluoric acid. A particularly valuable process has been described and claimed in U.S. specification No. 3,211,758, according to which hydrogen fluoride is used in the form of an adduct thereof with carbamic or thiocarbamic acid, especially with urea.

The free 21-aldehydes obtained by methods (b) and (c) or the 21,21-dihydroxy compounds accessible therefrom by hydration can be converted into the hemiacetals, acetals and acylates as described above under (a).

The compounds of the above Formulae II to IV to be used as starting materials are known or may be prepared by known methods. More especially, an aldehyde group in the compounds of the Formulae III and IV may be formed in the same manner as described above for method (a), and the aldehyde group may, if desired, be converted into the acetals, hemiacetals or esters in known manner.

The present invention is also concerned with the formulation of pharmaceutical preparations for use in human and veterinary medicine that contain the above-described pharmacologically active substances of the present invention in admixture or conjunction with a pharmaceutical excipient. Suitable excipients are inorganic or organic substances suitable for enteral, for example oral, parenteral or local administration. As such excipients there may be used substances that do not react with the new compounds, for example water, gelatin, lactose, starches, magnesium stearate, talcum, vegetable oils, benzyl alcohols, gums, polyalkyleneglycols, white petroleum jelly, cholesterol or other known medicinal excipients. The pharmaceutical preparations may be solid, for example tablets, dragees or capsules, or in liquid or semiliquid form solutions, suspensions, emulsions, ointments or creams. If desired, these pharmaceutical preparations may be sterilized and/or contain assistants such as preserving, stabilizing, wetting or emulsifying agents, salts for regulating the osmotic pressure or buffers. They may further contain other therapeutically valuable substances. The new compounds may also be used as starting materials for the manufacture of other valuable compounds.

The compounds of this invention may also be used as additives to animal fodder.

The following examples illustrate the invention.

EXAMPLE 1

2.05 grams of powdered $\Delta^{1,4}$-6α,9α-difluoro-16α-methyl-11β,17α,21-trihydroxy-3,20-dioxopregnadiene are covered with 120 ml. of methanol, and when most of the starting material has dissolved, 80 ml. of an 0.05 molar solution of cupric acetate monohydrate in methanol is added. While stirring the whole at a high speed, a vivid current of oxygen is passed for 2 hours through the reaction mixture; 20 ml. of an 0.7 molar aqueous solution of the di-sodium salt of ethylenediaminotetraacetic acid are added and the whole is reduced under vacuum to a residual volume of about 20 ml. Generally, the dehydrogenation product is first obtained in amorphous form, but is easy to crystallize by scratching with a glass rod and cooling to 0° C. After suctioning, washing and drying over calcium chloride there are obtained 2.09 g. of $\Delta^{1,4}$-6α,9α-difluoro - 16α - methyl - 11β,17α - dihydroxy-3,20-21-trioxopregnadiene in the form of its 21-methyl-hemiacetal melting at 129 to 135° C. in almost colourless granules.

EXAMPLE 2

A pharmaceutical preparation in the form of an ointment for the topical application containing as active ingredient the 21-methyl-hemiacetal of $\Delta^{1,4}$-3,20,21-trioxo-6α,9α-difluoro-11β,17α-dihydroxy - 16α - methylpregnadiene:

| Composition— | Percent |
| --- | --- |
| White petroleum jelly paraffin oil | 65 |
| Higher fatty alcohols waxes | 10 |
| Polyoxyethylene sorbitan derivatives sorbitan fatty acid esters | 4.45 |
| Preserving agents | 0.2 |
| Perfume | 0.1 |
| Water | 20.0 |
| 21-methyl-hemiacetal of $\Delta^{1,4}$-3,20,21-trioxo-6α,9α-difluoro - 11β,17α - dihydroxy-16α-methyl-pregnadiene | 0.25 |

The fats and the emulsifiers are melted together, the preserving agents dissolved in water and the water is emulsified with the melt at an elevated temperature. While the batch cools a suspension of the active principle in part of the melt is worked into the emulsion and the perfume then added.

What is claimed is:

1. A compound of the formula

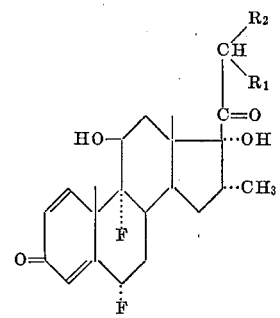

in which $R_1$ and $R_2$ each represents a member selected from the group consisting of a free, an esterified hydroxyl group derived from a carboxylic acid having 1 to 18 carbon atoms and an etherified hydroxyl group derived from an alcohol having 1 to 8 carbon atoms, and $R_1$ taken together with $R_2$ represents an oxo group.

2. A compound as claimed in claim 1, wherein the esterified hydroxyl groups are derived from carboxylic acids having from 1 to 18 carbon atoms.

3. A compound as claimed in claim 1, wherein the etherified hydroxyl groups are derived from alcohols containing from 1 to 8 carbon atoms.

4. A compound as claimed in claim 1 having the formula

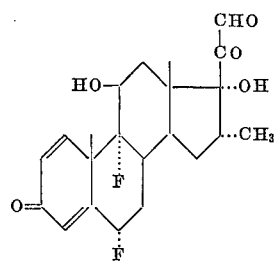

5. A compound as claimed in claim 1 having the formula

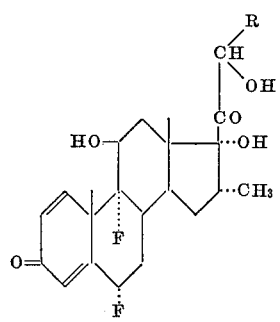

wherein R is a lower alkoxy group.

6. A compound as claimed in claim 1 having the formula
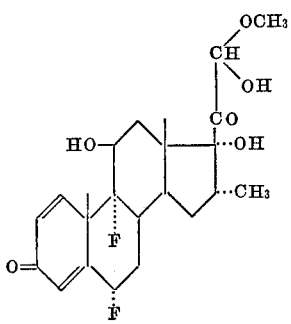
7. A compound as claimed in claim 1 having the formula
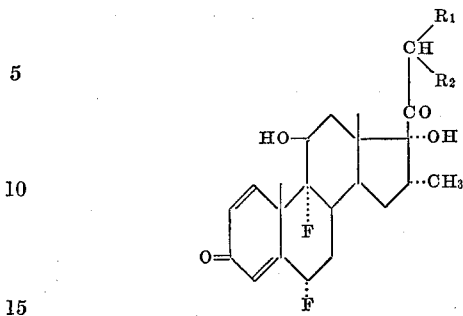
wherein $R_1$ and $R_2$ each represents a lower alkoxy group.
References Cited
UNITED STATES PATENTS
3,020,275   2/1962   Marx et al. _____ 260—239.55
HENRY A. FRENCH, Primary Examiner
U.S. Cl. X.R.
195—51; 260—239.5, 239.55; 424—243